United States Patent
Pallett et al.

(10) Patent No.: US 7,421,836 B2
(45) Date of Patent: Sep. 9, 2008

(54) AIR/FUEL RATIO VALIDATION FOR LEAN BURN

(75) Inventors: Tobias Pallett, Farmington, MI (US); Gopichandra Surnilla, West Bloomfield, MI (US); James Kerns, Trenton, MI (US); Suzanne Wait, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 71 days.

(21) Appl. No.: 11/514,600

(22) Filed: Sep. 1, 2006

(65) Prior Publication Data

US 2007/0051092 A1    Mar. 8, 2007

Related U.S. Application Data

(60) Provisional application No. 60/713,892, filed on Sep. 2, 2005.

(51) Int. Cl.
*F01N 3/00* (2006.01)
*F02D 41/14* (2006.01)

(52) U.S. Cl. .............. 60/274; 60/276; 73/118.1; 123/481; 123/688

(58) Field of Classification Search .............. 123/198 F, 123/481, 688, 690; 73/118.1; 60/276, 285, 60/274
See application file for complete search history.

(56) References Cited

U.S. PATENT DOCUMENTS

| | | | |
|---|---|---|---|
| 5,445,019 A | 8/1995 | Glidewell et al. | |
| 5,685,268 A | 11/1997 | Wakemen | |
| 5,920,004 A | 7/1999 | Gottshall et al. | |
| 6,758,185 B2 | 7/2004 | Surnilla et al. | |
| 7,234,455 B2 * | 6/2007 | Pallett et al. | 123/672 |
| 2005/0284132 A1 * | 12/2005 | Makki et al. | 60/285 |
| 2005/0284133 A1 * | 12/2005 | Kerns et al. | 60/285 |

* cited by examiner

*Primary Examiner*—T. M Argenbright
(74) *Attorney, Agent, or Firm*—Allan Lippa; Alleman Hall McCoy Russell & Tuttle, LLP

(57) ABSTRACT

A multi-cylinder group engine system operable in at least a first mode and a second mode, where in the first mode a first and second cylinder group combust air and fuel, and where in the second mode at least one of the first and second cylinder group combusts air and fuel and the other one of the first and second cylinder group pumps air without injected fuel, the engine system comprising of a first linear exhaust gas sensor disposed in a first exhaust passage to measure air fuel exhausted from the first cylinder group; a first switching type exhaust gas sensor disposed in a second exhaust passage to measure air-fuel exhausted from the second cylinder group; a second linear exhaust gas sensor disposed downstream of a junction between the first exhaust passage and the second exhaust passage; and a controller configured to validate a reading of the first linear exhaust gas sensor during the first mode of engine operation based on a reading of the second linear exhaust gas sensor when a lean air-fuel ratio is commanded.

20 Claims, 11 Drawing Sheets

US 7,421,836 B2

AIR/FUEL RATIO VALIDATION FOR LEAN BURN

This application claims priority to U.S. Provisional Application No. 60/713,892, filed Sep. 2, 2005, the entire contents of which are incorporated herein by reference.

BACKGROUND

Some engine control strategies monitor operating parameters using exhaust gas sensors in order to control engine output. For example an engine control strategy may adjust engine torque based on a feedback air-fuel ratio. Furthermore, some engine control strategies advantageously monitor the exhaust gas sensors in order to determine functionality.

One approach attempts to monitor air-fuel sensors based on various parameters includes performing diagnostics on sensors based on the sensor's exposure to different air-fuel ratios and air amounts. See, for example, U.S. Pat. No. 6,758,185.

However, the inventors herein have recognized that this approach may have some disadvantages. For example, when the above approach is applied to a system with cylinder group specific modes of engine operation and an asymmetric air-fuel sensor configuration in the exhaust, diagnosis of sensor degradation may have larger errors due to confounded readings based on mixed air-fuel measurements as a result of each cylinder group operating at a different air-fuel ratio. Furthermore, some sensor types may produce more accurate readings in specific air-fuel ratio ranges and may have different accuracies corresponding to one another. For example, a linear exhaust gas sensor may have more accurate air-fuel ratio readings in a lean air-fuel ratio range. As another example a switching type exhaust gas sensor may have more accurate air-fuel ratio reading at stoichiometry. Therefore, diagnosis of sensor degradation in a system containing various engine modes with different air-fuel ratios and different exhaust gas sensor configurations may have increased errors depending on the type of sensor and respective range of measurement accuracy.

The above issues may be addressed by, in one example, a multi-cylinder group engine system operable in at least a first mode and a second mode, where in the first mode a first and second cylinder group combust air and fuel, and where in the second mode at least one of the first and second cylinder group combusts air and fuel and the other one of the first and second cylinder group pumps air without injected fuel, the engine system comprising: a first linear exhaust gas sensor disposed in a first exhaust passage to measure air fuel exhausted from the first cylinder group; a first switching type exhaust gas sensor disposed in a second exhaust passage to measure air-fuel exhausted from the second cylinder group; a second linear exhaust gas sensor disposed downstream of a junction between the first exhaust passage and the second exhaust passage; and a controller configured to validate a reading of the first linear exhaust gas sensor during the first mode of engine operation based on a reading of the second linear exhaust gas sensor when a lean air-fuel ratio is commanded.

In this way, air-fuel control readings may be validated in an asymmetric sensor configuration to facilitate accurate engine control throughout different modes of engine operation. In particular, a linear exhaust gas sensor may advantageously be validated based on another linear exhaust gas sensor during lean operation due to the accurate nature of linear exhaust gas sensor measurements in a lean air-fuel ratio range. Furthermore, by validating the readings of the exhaust gas sensors the engine control strategy may reduce the likelihood of inaccurate engine torque control and estimation, increased emissions and/or reduced fuel economy due to errors in air-fuel control because of sensor degradation.

BRIEF DESCRIPTION OF THE FIGURES

The above features and advantages will be readily apparent from the following detailed description of example embodiment(s). Further, these features and advantages will also be apparent from the following figures.

DETAILED DESCRIPTION

Figure 1:
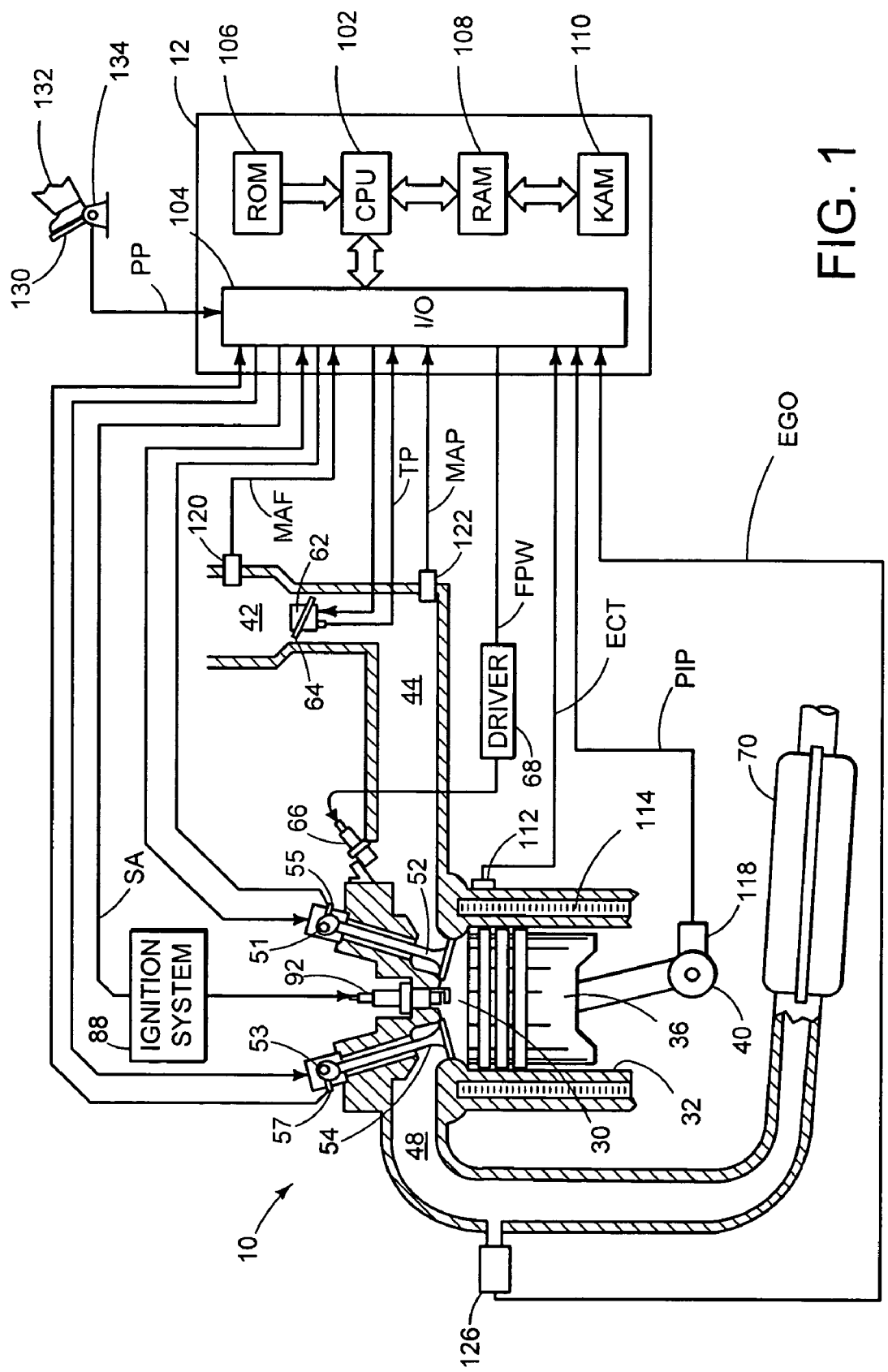
FIG. 1 is a schematic depiction of an exemplary embodiment of an engine according to the present disclosure.

FIG. 1 shows a schematic diagram of one cylinder of multi-cylinder internal combustion engine 10. Combustion chamber or cylinder 30 of engine 10 is shown including combustion chamber walls 32 and piston 36 positioned therein and connected to crankshaft 40. A starter motor (not shown) may be coupled to crankshaft 40 via a flywheel (not shown). Cylinder 30 may communicate with intake port 44 and exhaust port 48 via respective intake valve 52 and exhaust valve 54. Intake valve 52 and exhaust valve 54 may be actuated via intake camshaft 51 and exhaust camshaft 53. Further, the position of intake camshaft 51 and exhaust camshaft 53 may be monitored by intake camshaft sensor 55 and exhaust camshaft sensor 57 respectively. In an exemplary embodiment, intake and exhaust valve control may be provided by signals supplied by controller 12 via electric valve actuation (EVA). Additionally intake and exhaust valve may be controlled by various other mechanical control systems including cam profile switching (CPS), variable displacement engine (VDE), variable cam timing (VCT), variable valve lift (VVL), and/or variable valve timing (VVT). In some embodiments, valve control strategy may include a combination of two or more of the above mentioned control techniques. While cylinder 30 is shown having only one intake valve and one exhaust valve, it should be appreciated that in some embodiments cylinder 30 may have two or more intake and/or exhaust valves.

Fuel injector 66 is shown coupled to intake port 44 for delivering injected fuel in proportion to the pulse width of signal FPW received from controller 12 via electronic driver 68. Fuel may be delivered to fuel injector 66 by a fuel system (not shown) including a fuel tank, fuel pumps, and a fuel rail. Engine 10 is described herein with reference to a gasoline burning engine, however it should be appreciated that in some embodiments, engine 10 may be configured to utilize a variety of fuels including gasoline, diesel, alcohol, hydrogen, and combinations thereof.

Intake port 44 is shown communicating with intake manifold 42 via throttle plate 64. Further, throttle plate 64 may be coupled to electric motor 62 such that the position of throttle plate 64 may be controlled by controller 12 via electric motor 62. Such a configuration may be referred to as electronic throttle control (ETC), which may be utilized during idle speed control. In an alternative embodiment (not shown), a bypass air passageway may be arranged substantially parallel with throttle plate 64 to control inducted airflow during idle speed control via a throttle control valve positioned within the air passageway.

Distributorless ignition system 88 may provide ignition spark to combustion chamber 30 via spark plug 92 in response to spark advance signal SA from controller 12. Though spark ignition components are shown, engine 10 (or a portion of cylinders thereof) may not include spark ignition components in some embodiments and/or may be operated without requiring a spark.

Engine 10 may provide torque to a transmission system (not shown) via crankshaft 40. Crankshaft 40 may be coupled to a torque converter which is also coupled to a transmission via a turbine shaft. Torque converter may include a bypass, or lock-up clutch. The lock-up clutch may be actuated electrically, hydraulically, or electro-hydraulically, for example. The transmission may comprise an electronically controlled transmission with a plurality of selectable discrete gear ratios. Alternatively, in some embodiments, the transmission system may be configured as a continuously variable transmission (CVT), or a manual transmission.

Exhaust gas sensor 126 is shown coupled to exhaust port 48 upstream of catalytic converter 70. It should be noted that sensor 126 may correspond to a plurality of various different sensors and catalytic converter 70 may correspond to a plurality of various emissions devices positioned in the exhaust, depending on the exhaust configuration (described in detail below with regard to FIGS. 2A-2C). Sensor 126 may be any of many know sensors for providing an indication of exhaust gas air/fuel ratio such as an exhaust gas oxygen (EGO) sensor, linear oxygen sensor, an UEGO, a two-state oxygen sensor, a HEGO, or an HC or CO sensor. For example, a higher voltage state of signal EGO indicates that exhaust gases may be rich of stoichiometry and a lower voltage state of signal EGO indicates that exhaust gases may be lean of stoichiometry. Further, signal EGO may be used during air/fuel control in order to estimate and validate various aspects of a desired engine control mode as will be described in greater detain below.

Controller 12 is schematically shown in FIG. 1 as a microcomputer, including microprocessor unit (CPU) 102, input/output ports 104, an electronic storage medium, (ROM) 106, random access memory (RAM) 108, keep alive memory (KAM) 110, and a data bus. Controller 12 is shown receiving various signals from sensors coupled to engine 10, in addition to those signals previously discussed, including measurement of inducted mass air flow (MAF) from mass air flow sensor 120 coupled to intake manifold 42; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor in electronic motor 64; and absolute Manifold Pressure Signal MAP from sensor 122. A pedal position indication (PP) may be determined by a pedal position sensor 134 that senses the angle of pedal 130 according to driver input 132. Engine speed signal RPM may be generated by controller 12 from signal PIP and manifold pressure signal MAP from a manifold pressure sensor provides an indication of vacuum, or pressure, in the intake manifold. Controller 12 may be configured to cause combustion chamber 30 to operate in various modes of operation including homogeneous or stratified spark ignition or compression ignition modes, for example. Controller 12 may control the amount of fuel delivered by fuel injector 66 so that the air/fuel mixture in cylinder 30 may be selected to be at stoichiometry, a value rich of stoichiometry or a value lean of stoichiometry. In some embodiments, controller 12 may control the amount of fuel vapors purged into the intake port via a fuel vapor purge valve (not shown) communicatively coupled thereto. Further, in some embodiments, engine 10 may include an exhaust gas recirculation (EGR) system that routes a desired portion of exhaust gas from exhaust port 48 to intake port 44 via an EGR valve (not shown). Alternatively, a portion of combustion gases may be retained in the combustion chambers by controlling exhaust valve timing.

As described above, FIG. 1 merely shows one exemplary cylinder of a multi-cylinder engine, and that each cylinder has its own set of intake/exhaust valves, fuel injectors, spark plugs, etc. Furthermore, although the above described engine is shown with a port injection configuration, it should be appreciated that an engine may be configured to inject fuel directly into the cylinders without parting from the scope of this disclosure.

Figure 2A:
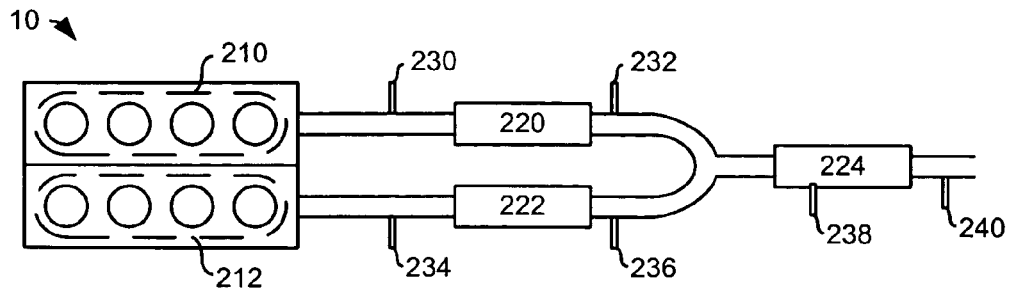
FIGS. 2A-2C are schematic depictions of different exemplary engine and exhaust system configurations.
Figure 2B:
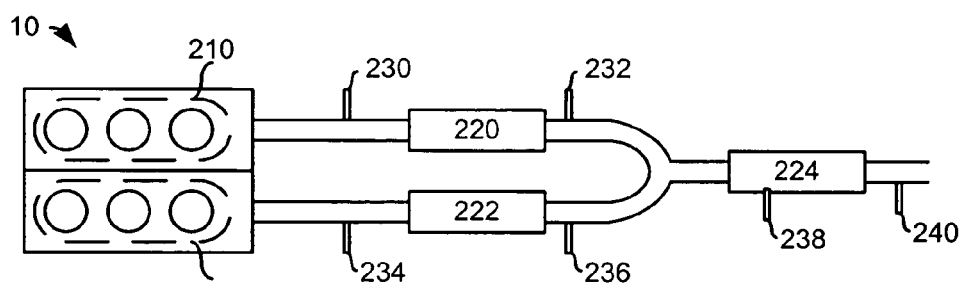
Figure 2C:
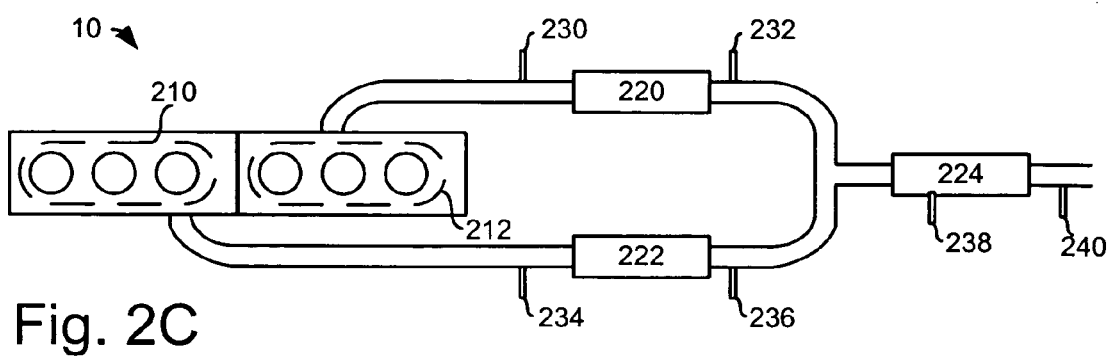

FIGS. 2A-2C show exemplary multi-group engine configurations (such as 2-bank engines, etc.) with Y-pipe exhaust, and/or an asymmetric sensor configuration. Note that these Figures are purely exemplary and other multi-group engine configurations also may be used. It should be appreciated that a cylinder group may include one or more cylinders. Further, note that while numerous sensors are shown throughout the exhaust system, in some embodiments a subset of these sensors may be used.

Referring now to FIG. 2A, an exemplary asymmetric exhaust sensor configuration is described using a V-8 engine. The asymmetric configuration may be beneficial for detection of different operating condition throughout operation of different engine modes. Cylinders of a first combustion chamber group (which are shown as a bank, although the group may include cylinders from multiple banks, or may include a subset of cylinder in a bank) 210 may be coupled to first catalytic converter 220, while cylinders of a second combustion group 210 (which is also shown as a bank, but as noted above is not necessarily limited to a bank) may be coupled to second catalytic converter 222. Linear exhaust gas sensor 230 may be disposed between engine group 210 and first catalyst 220. In some embodiments sensor 230 may be a universal exhaust gas oxygen (UEGO) sensor. Further, switching type exhaust gas sensor 232 may be disposed downstream of first catalyst 220. In some embodiments sensor 232 may be a heated exhaust gas oxygen (HEGO) sensor. Switching type exhaust gas sensor 234 may be disposed between engine group 212 and second catalyst 222. Further, switching type exhaust gas sensor 236 may be disposed downstream of second catalyst 222. In some embodiments sensors 234 and 236 may be HEGO sensors. Exhaust gas exiting from first catalyst 220 and second catalyst 222 merge in a Y-pipe configuration before entering downstream under body catalyst 224. In some embodiments downstream catalyst 224 may be a lean NOx trap. Temperature sensor 238 may be disposed in underbody catalyst 224, while a combined NOx-UEGO sensor 240 may be disposed downstream of underbody catalyst 224.

Note that a linear exhaust gas sensor (more specifically a UEGO sensor) may provide a substantially linear indication of exhaust air-fuel ratio across a range of air-fuel ratios from at least 12:1 to 18:1, or 11:1 to 20:1, or various other ranges and subranges. The substantially linear relationship between the sensor output voltage and exhaust gas oxygen concentration allows the sensor to operate across a wide range of air-fuel ratios, and therefore can provide advantageous information when operating away from stoichiometry.

Further note that a switching type or non linear exhaust gas sensor (more specifically a HEGO sensor) may provide a high gain between measured oxygen concentration and voltage output. That is, a nonlinear sensor may produce an output that is close to being a step change in voltage at stoichiometry. Hence, the switching type exhaust gas sensor may provide an accurate indication of the stoichiometric point based on the voltage step output.

In some embodiments, various sensors may be integrated into the catalysts while other sensors may be placed upstream or downstream of the catalyst. For example, sensor 240 may be integrated into underbody catalyst 224 or sensor 238 may be placed upstream of underbody catalyst 224. Further, in some embodiments sensors may be disposed between bricks in a multi-brick catalyst, such as sensor 240.

Also, sensors 230-240 may be sensors of various types. For example, the sensors may be any of many example sensors for providing an indication of exhaust gas air/fuel ratio such as a linear oxygen sensor for providing indication of air-fuel ratio across a broad range, a switching type exhaust gas oxygen sensors that provide a switch in sensor output at the stoichiometric point, a UEGO, a two-state oxygen sensor, an EGO, a HEGO, or an HC or CO sensor. Furthermore, in some embodiments, mixed sensor types may be used, for example, a UEGO sensor may also have NOx detection capabilities.

In some embodiments first catalyst 220 and second catalyst 222 may be three way catalysts that retain oxidants when operating lean and release and reduce the retained oxidants when operating rich. Additionally, underbody catalyst 224 may be configured to operate as a lean NOx trap which may reduce residual oxidants that flow downstream. Further, the illustrated catalysts may represent multiple bricks, and/or may represent several separate emission control devices. Note that in some embodiment various other emission control devices may be used.

The above described configuration may be considered asymmetric due to the fact that two or more engine banks or groups may be monitored by at least one different type of sensor. In this particular embodiment, feed gas from first bank or cylinder group 210 may be monitored by linear exhaust gas sensor 230, while feed gas from second engine bank or cylinder group 212 may be monitored by a switching type exhaust gas sensor 234. Furthermore, note that in some embodiments the linear exhaust gas sensor and the switching type exhaust gas sensor may be configured such that the sensors may be disposed in exhaust flows of the engine banks or groups opposite of what is shown in FIGS. 2A-2C. In some embodiments, the asymmetric configuration may be applied to various other cylinder groupings and/or exhaust system configurations. For example, in an asymmetric configuration sensors may be located in positions downstream of catalysts, or one sensor may be upstream and another downstream.

Also, while FIG. 2A shows a V-8 engine, various other numbers of cylinders may be used. For example, an I-4 engine may be used, where there are two groups of two cylinders leading to a common exhaust path with upstream and downstream emission control devices.

Referring now to FIG. 2B, a system similar to that in FIG. 2A is shown, however a V-6 type engine is shown, rather than a V-8 engine.

Referring now to FIG. 2C, a system similar to that in FIG. 2A is shown, however an inline type engine (I-6) is shown, rather than a V-8 engine.

As described below, such asymmetric configurations may be used to advantage during various modes of operation, such as, for example, stoichiometric operation, lean burn operation, operation of decontamination cycles, in particular, desulfation (DeSOx) mode, partial cylinder fuel cut-out mode, as well as various other modes of operation.

For example, the engine may operate at stoichiometry, namely one or more (e.g. both) engine banks or cylinder groups may operate with an air-fuel ratio about stoichiometry. Furthermore, the engine may operate lean wherein both engine banks or cylinder groups may operate with an air-fuel ratio lean of stoichiometry in order to increase fuel economy.

Additionally, during decontamination cycles, such as desulfation (DeSOx) mode, for example, first engine group 210 may operate with an air-fuel ratio that is rich and second engine group 212 may operate with an air-fuel ratio that is lean. In this way, the mixed exhaust from the two engine banks may be substantially stoichiometric downstream and generate exothermic heat. During DeSOx mode the engine groups further may alternate between rich and lean operation within each cycle in order to reduce particulate buildup in the catalysts.

Furthermore, during lean burn partial cylinder fuel injector cut-out mode a first group of cylinders may operate lean, and a second group of cylinders may induct gasses without injected fuel. This mode of engine operation may increase fuel economy while also increasing engine output efficiency. Alternatively, in a stoichiometric partial cylinder fuel injector cut-out mode, a first group of cylinders may operate about stoichiometry, and a second group of cylinders may induct gases without injected fuel. In still another example, partial cylinder fuel injector and cylinder valve deactivation may be used, where the cylinder valves and fuel injectors may be deactivated. This mode of operation may provide engine output characteristic similar to that of a variable displacement engine due to the fact that the cylinders with fuel cut-out also have valve deactivation in order to maintain stoichiometric output by the active cylinders so that the exhaust may be treated in the three way catalysts.

Furthermore, in some embodiments a controller may be configured to operate the engine in a mode, where both the first and second cylinder groups pump air without injecting fuel. This mode of operation may be used for example, during vehicle deceleration to further improve fuel economy.

It should be appreciated that during fuel injector cut-out modes cylinders designated for fuel cut-out may be grouped by engine group or bank. Alternatively, in some embodiments a particular cylinder grouping may include cylinders in both engine banks. Further, fuel cut-out may be limited to individual cylinders or groups of cylinders. Cylinder groupings may be designated according to an engine control strategy. Such a strategy may designate an engine bank or cylinder group for fuel injector cut-out based on detection of various operating conditions. For example, fuel injector cut-out mode may switch between engine banks or cylinder groups to maintain even wear on cylinders in each engine bank or cylinder group.

Note that the above engine modes are exemplary. Further, the above described engine operations may be employed in combination with other operating modes or may include variations based on different operating parameters. For example, each of the above modes may include further variations based on, for example, cam timing, valve lift, throttle position, etc.

Additional details of control routines are included below which may be used with various engine configurations, such as those described in FIGS. 1 and 2A-2C. As will be appreciated by one of ordinary skill in the art, the specific routines described below in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages of the example embodiments of the invention described herein, but is provided for ease of illustration and description. Although not explicitly illustrated, one of ordinary skill in the art will recognize that one or more of the illustrated acts or functions may be repeatedly performed depending on the particular strategy being used. Further, these figures may graphically represent code to be programmed into the computer readable storage medium in controller 12.

Figure 3A:
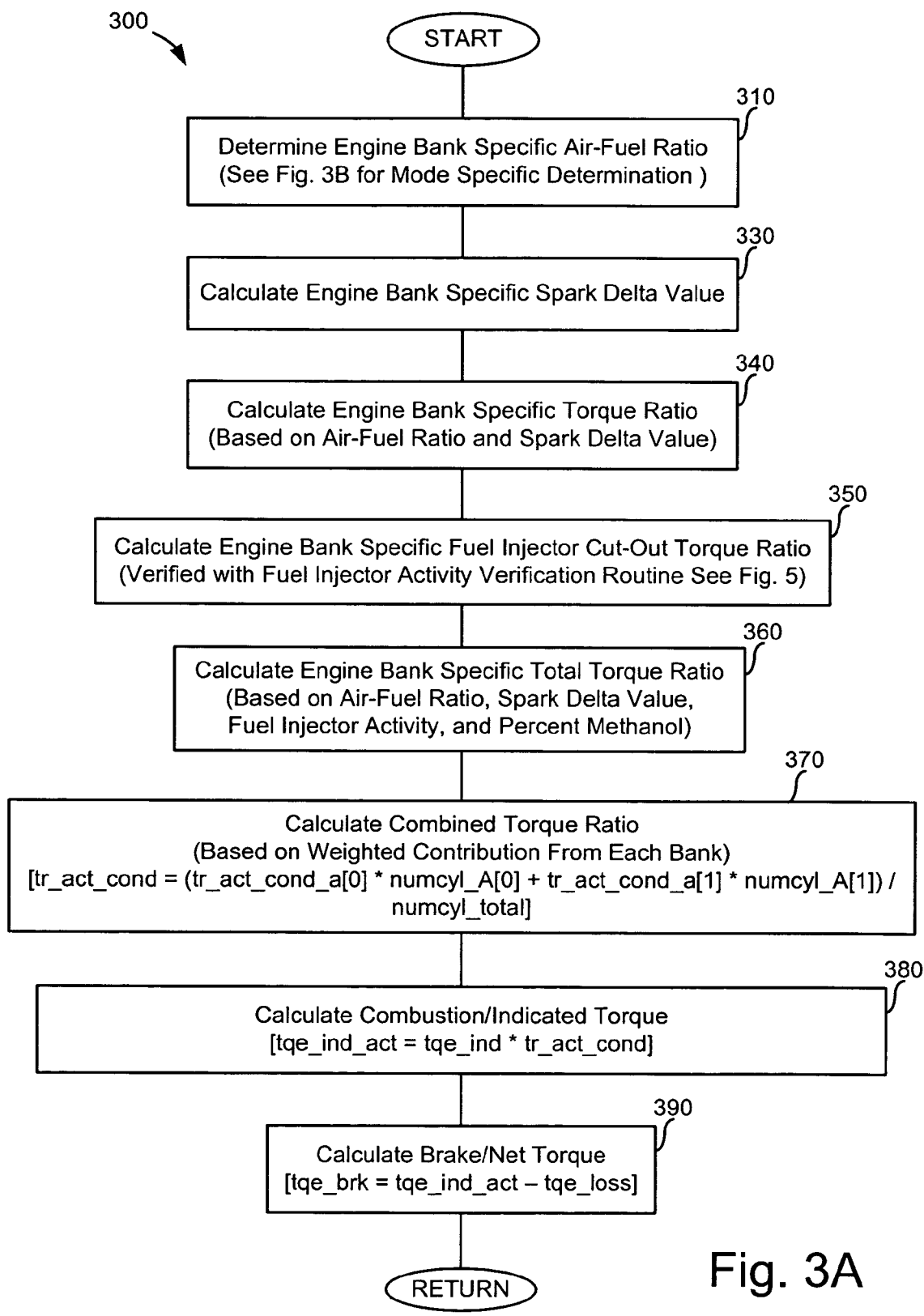
FIGS. 3A-3B are flow diagrams of an exemplary embodiment of a method of estimating maximum torque in an engine.
Figure 3B:
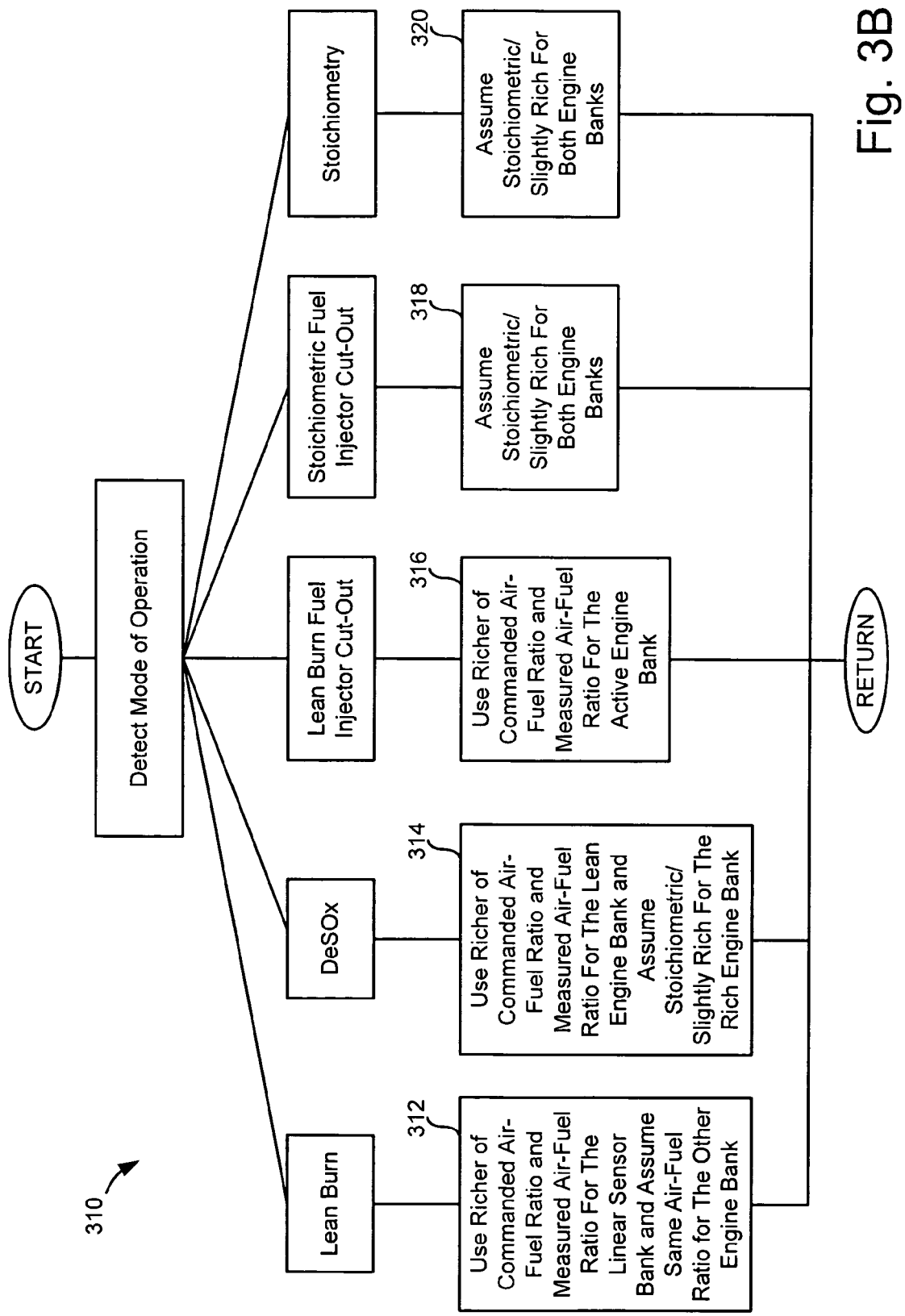

FIGS. 3A-3B show flow diagrams depicting a method of estimating maximum torque produced by an engine during various modes of operation, wherein the engine exhaust may be configured with an asymmetric exhaust sensor configuration. Specifically, the example approaches described herein may be used to estimate torque in a robust manner such that issues associated with inaccurate torque estimations may be addressed. For example, in the case of a continuously variable transmission, if the actual torque is higher than the estimated torque, excessive wear and/or damage to the transmission may occur over time due to insufficient clutch/band pressure. However, if the estimated torque is less than the actual torque the clutch/band pressure may be set higher than optimal resulting in reduced drivability and fuel economy. The torque estimation process described in FIGS. 3A-3B may be used to overcome some of these issues resulting in a more robust control strategy.

Now referring to FIG. 3A, one example routine of torque estimation begins at 310, where the engine bank or cylinder group specific air-fuel ratios are determined. While this routine describes a bank specific approach, various types of cylinder groupings may be used, as noted herein with regard to FIG. 2. As shown in FIG. 3B, the determination of 310 varies according to the detected mode of operation. If it is determined that the engine is operating in a lean bum mode, the routine moves to 312, where the air-fuel ratio measured by the feedgas UEGO sensor may be validated via an air-fuel ratio validation routine (described in more detail below with regard to FIGS. 4A-4B). If the air-fuel ratio measurement from the feedgas UEGO sensor is validated, it may be assumed that each engine bank or cylinder group is operating under the same or similar lean conditions. Thus, the air-fuel ratio determination can be assumed to be the same for each engine bank or cylinder group. Accordingly, the air-fuel ratio of each engine bank or cylinder group may be determined by comparing the commanded (desired) air-fuel ratio for each engine bank or cylinder group from the engine controller to the actual air-fuel ratio measured by the feedgas UEGO sensor. The smaller (richer) of the two air-fuel ratios may be determined to be the air-fuel ratio used for the maximum torque estimation. If the determined air-fuel ratio is rich beyond a desired torque output value, the air-fuel ratio may be clipped to the desired torque output value.

In the case where the feedgas UEGO sensor validation is unsuccessful, the commanded air-fuel ratio may be used for the maximum torque estimation. Furthermore, if the commanded air-fuel ratio is rich beyond a desired torque output value, the air-fuel ratio may be clipped to the desired torque output value.

If it is determined that the engine is operating in a DeSOx mode, the routine moves to 314. As discussed above, during DeSOx mode a first engine bank or cylinder group may operate lean and a second engine bank or cylinder group may operate rich. The air-fuel ratio of the engine bank or cylinder group operating lean may be determined by comparing the commanded air-fuel ratio from the engine controller to the actual air-fuel ratio measured by the feedgas UEGO sensor. The smaller (richer) of the two air-fuel ratios may be determined to be the air-fuel ratio used for the maximum torque estimation. If the determined air-fuel ratio is rich beyond a desired torque output value, the air-fuel ratio may be clipped to the desired torque output value.

Furthermore, the air-fuel ratio of the engine bank or cylinder group operating rich may be assumed to be operating at stoichiometry or slightly rich for a desired maximum output value.

If it is determined that the engine is operating in a lean bum injector cut-out mode, the routine moves to 316. In this engine operation mode, the air-fuel ratio determination may be made for the active engine bank or cylinder group. When the engine bank or cylinder group upstream of the feedgas UEGO sensor is active, the air-fuel ratio may be determined by comparing the commanded air-fuel ratio from the engine controller to the actual air-fuel ratio measured by the feedgas UEGO sensor. The smaller (richer) of the two air-fuel ratios may be determined to be the air-fuel ratio used for the maximum torque estimation. If the determined air-fuel ratio is rich beyond a desired torque output value, the air-fuel ratio may be clipped to the desired torque output value. In some instances the desired output value may be a maximum torque value.

Otherwise, if the active engine bank or cylinder group is on the other branch of the Y-pipe exhaust (non UEGO sensor branch) the air-fuel ratio may be determined to be the commanded air-fuel ratio.

It should be appreciated that in some embodiments the air-fuel ratio for each engine bank or cylinder group may be determined only using the commanded air-fuel ratio. For example, in some V-8 engine configurations cylinders may be grouped such that a cylinder group may produce exhaust down both pipes of a Y-pipe exhaust configuration. In such a configuration not all exhaust from the active cylinder group may travel past the feedgas UEGO sensor making the measurements from the feedgas UEGO sensor erroneous with regard to accurately determining the cylinder group's air-fuel ratio. In this example, when the engine is in lean bum fuel injector cut-out mode, the air-fuel ratio for each engine bank or cylinder group is assumed to be the commanded air-fuel ratio.

If it is determined that the engine is operating in a stoichiometric injector cut-out mode, the routine moves to 318. In this engine operating mode, the air-fuel ratio determination is made for the active engine bank or cylinder group, and the air-fuel ratio of the active engine bank or cylinder group may be assumed to be stoichiometry or slightly rich of stoichiometry for the estimate of maximum torque output value.

If it is determined that the both engine banks or cylinder groups are operating at stoichiometry, the routine moves to 320. At 320, the air-fuel ratio of both engine banks or cylinder groups can be assumed to be stoichiometry or slightly rich of stoichiometry for the estimate of maximum torque output value.

It should be appreciated that in some embodiments the commanded air-fuel ratio term used in the above described engine bank or cylinder group specific air-fuel ratio determination may further include a long term correction term which may take into account engine component degradation and other suitable correction factors.

After the engine bank or cylinder group specific air-fuel ratios are determined, the routine moves to 330 where the spark delta of each engine bank or cylinder group may be calculated. This calculation may be performed in different ways. In one example, a spark delta figure may be retrieved from a lookup table mapped to the minimum spark timing for best torque (MBT) output across the operating range of the engine, based on such conditions as coolant temperature, humidity, air temperature, and/or various others.

Next, the routine calculates the torque ratio of each engine bank or cylinder group at 340 using the previously determined engine bank or cylinder group specific air-fuel ratios and spark delta. Further at 350, the routine calculates the torque ratio of the active engine bank if the engine is operating in a fuel injector cut-out mode. This calculation may also be supported by verification of the fuel injector activity by a fuel injector activity verification routine (discussed in more detail below with regard to FIGS. 5A-5B).

Continuing on, the routine calculates the total torque ratio of each engine bank at 360 using the determined air-fuel ratios, spark delta, and fuel injector activity verification information. In some embodiments a percent methanol figure may also be taken into consideration to account for the combustibility and/or energy density of the fuel.

Next at 370, routine 300 calculates the combined engine bank torque ratio while taking into consideration the weighted torque contribution of the active cylinders in each engine bank. Specifically, the combined torque ratio of the engine (tr_act_cond) may be calculated by adding the actual torque (tr_act_cond_a[0]) produced by cylinders in a fist engine bank (bank [0]) multiplied by the number of active cylinder in that bank (numcyl_A[0]) to the actual torque (tr_act_cond_a[1]) produced by cylinders in a second engine bank (bank [1]) multiplied by the number of active cylinders in that engine bank (numcyl_A[1]).

Further at 380, the routine calculates the combustion/indicated torque. Specifically, the combustion/indicated torque (tqe_ind_act) may be calculated by multiplying the previously calculated combined torque ratio of the engine (tr_act_cond) with the indicated torque (tqe_ind), where the indicated torque is the MBT torque output at stoichiometry.

Finally at 390, the routine calculates the brake (net) torque. Specifically, the brake torque (tqe_brk) equals the combustion/indicated torque (tqe_ind_act) minus the total torque loss (tqe_loss). The total torque loss may be the sum of the losses due to friction, pumping losses, parasitic losses associated with a front engine accessory drive (FEAD), and any other suitable loss determinant. Accordingly, torque estimation routine 300 may be repeated numerous times throughout engine operation in order to provide a robust engine control strategy.

In this way, a robust maximum engine torque estimation may be made for an engine control system that includes different modes of engine operation. Furthermore, the robust torque estimation may facilitate engine output according to driver demand without causing adverse affects such as for example, reduced fuel economy and lowered drivability. The above estimated torque may be used for various operations, such as controlling/adjusting a ratio of a stepped or continuously variable transmission, controlling/adjusting transmission clutch pressures, monitoring engine torque production versus driver demand, adjusting engine actuators such as a throttle position or spark timing, and various others.

Furthermore, in some embodiments an additional feedgas linear exhaust gas sensor may be disposed in the exhaust passage coupled to the second cylinder group, so that a linear exhaust gas sensor may be used to detect the air-fuel ratio of each of the first and second cylinder groups. In such a configuration the smaller (richer) air-fuel ratio of the two feedgas linear exhaust gas sensors may be used for the maximum torque estimation. Note that in some embodiments additional linear exhaust gas sensors may be disposed in the exhaust system downstream of the feedgas linear exhaust gas sensors for added redundancy and confirmation of measured air-fuel ratios.

In an exemplary embodiment, electronic engine controller 12 may further include an on-board diagnostic (OBD) system (not shown). The OBD system may detect operating component degradation through various diagnostic routines. In some instances, if a routine detects performance degradation, the routine may set a fault (or condition) flag and may trigger a diagnostic trouble code (alternatively referred to as a service code) in the electronic engine controller. As another example, if a routine detects performance degradation, one or more modes of operation may become restricted or disabled. Many routines within the on-board diagnostics system may detect emission related degradation in a range of operating conditions of the engine.

One embodiment advantageously implements a routine to monitor air-fuel measurements from a feedgas UEGO sensor in order to prevent air-fuel control operation based on errors in the feedgas UEGO sensor. Exemplary air-fuel validation routine 400 may be used to validate a feedgas UEGO sensor measurement in an asymmetric exhaust sensor configuration based on a downstream UEGO sensor measurement. Specifically, the routine validates the feedgas UEGO senor measurement by comparing it to the tailpipe UEGO sensor measurement, while also taking into consideration mode of engine operation, transportation delay times, catalyst impact and other noise factors.

Figure 4A:
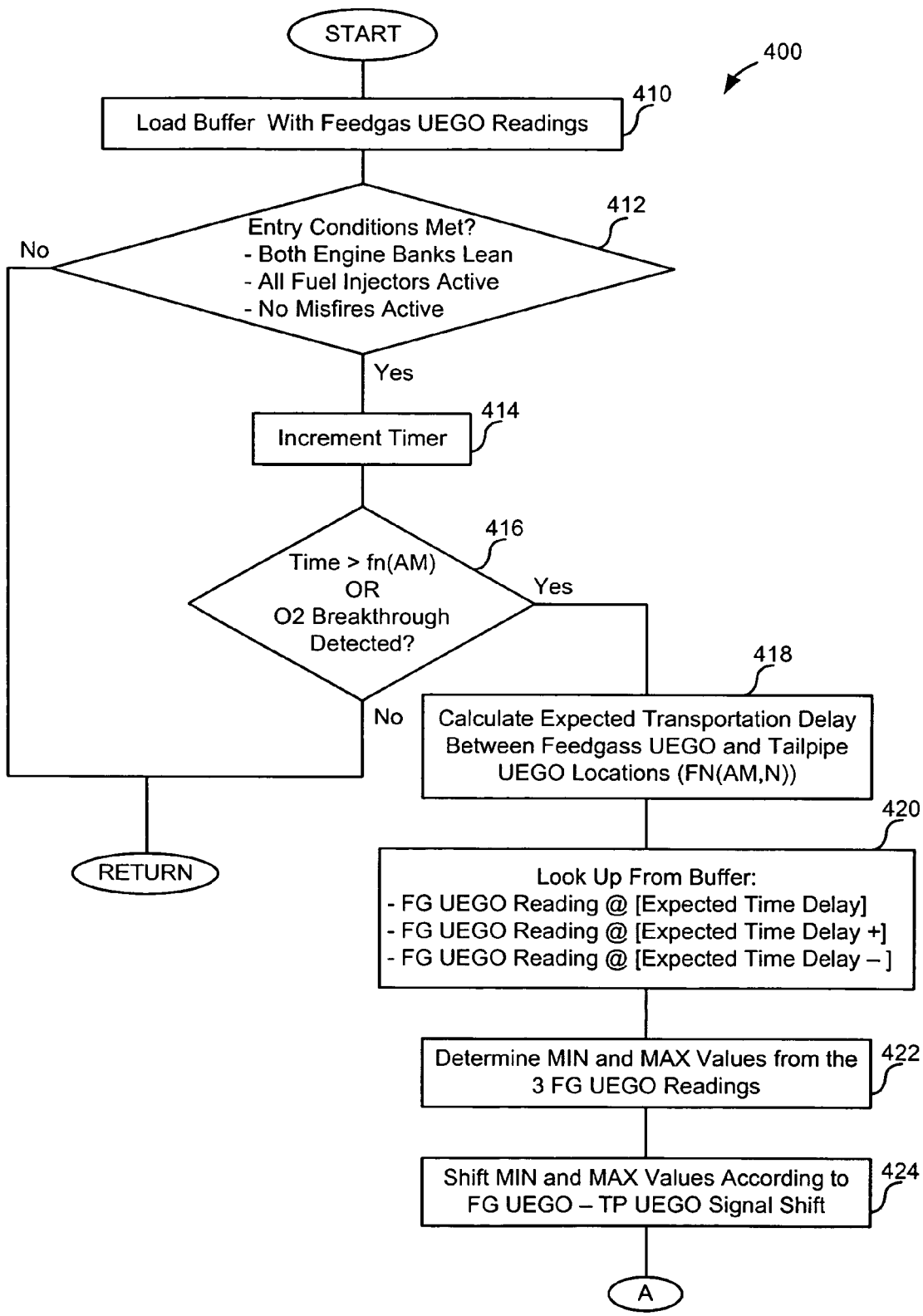
FIGS. 4A-4B are flow diagrams of an exemplary embodiment of a method of validating air-fuel ratio measurements of UEGO sensors in the exhaust system of an engine.
Figure 4B:
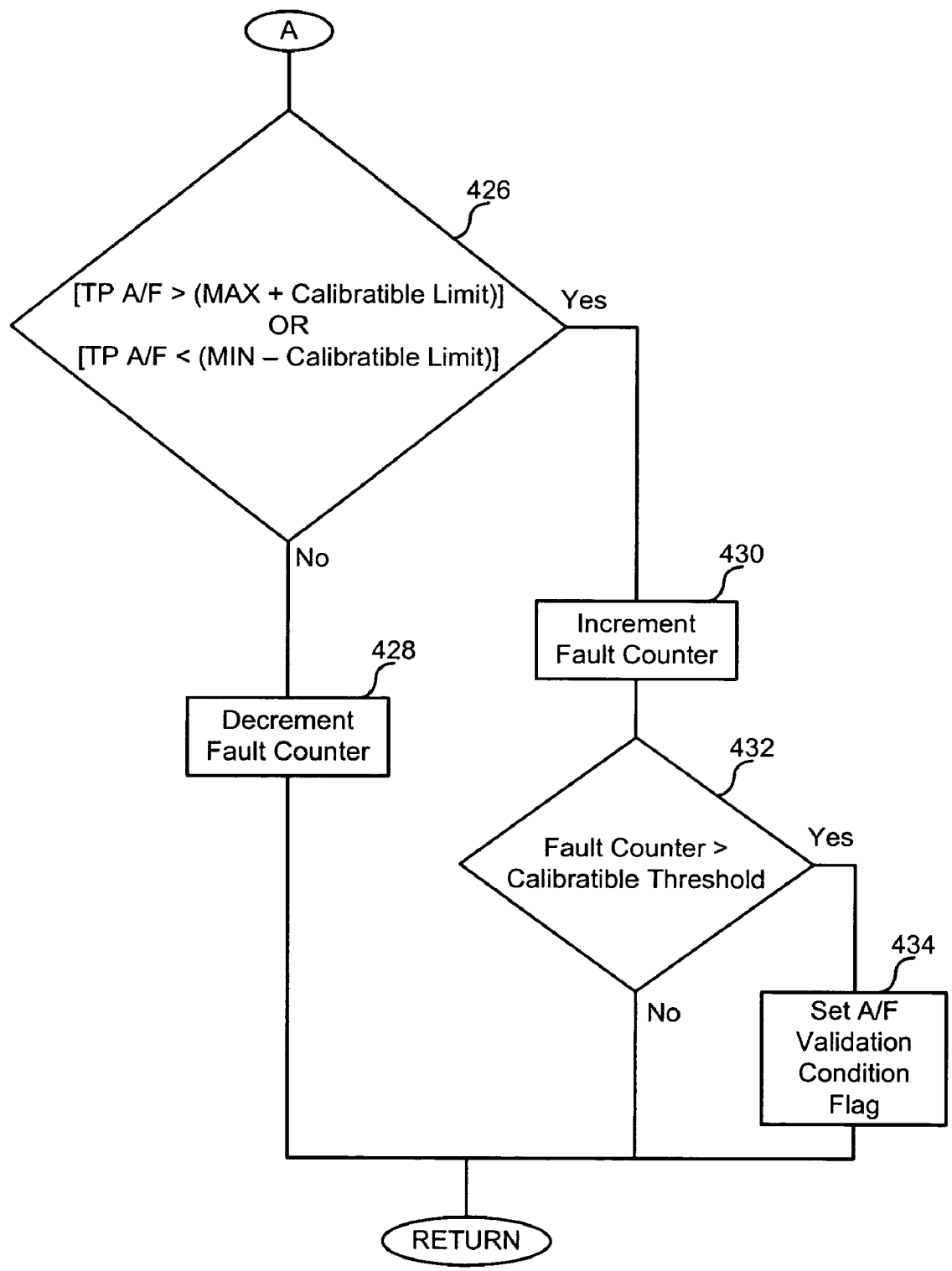

Now referring to FIG. 4A, routine 400 begins by buffering feedgas UEGO measurements taken over a period of three seconds into memory in the engine controller at 410. Although the routine buffers feedgas UEGO sensor measurements over a period of three seconds, it should be appreciated that any suitable period of time or number of events, such as crank angles, may be buffered so long as it is sufficient to cover the maximum exhaust transportation time from the feedgas to tailpipe UEGO locations.

Next at 412, routine 400 checks the entry conditions for the air-fuel validation routine. Specifically, the routine confirms that both engine banks are operating in a lean bum mode, that all fuel injectors are active, and that no misfires are taking place. These checks are performed because certain modes of operation and engine conditions may cause the UEGO sensors' readings to not accurately represent the air-fuel ratio of the engine.

For example, in DeSOx mode a lean air-fuel ratio exhausted from one engine bank may be read by the feedgas UEGO sensor, and a rich air-fuel ratio may be exhausted from the other engine bank. Further, the air-fuel ratios may combine downstream to become approximately stoichiometric before being read by the tailpipe UEGO sensor. In this case, the feedgas UEGO sensor on one engine bank measures lean, however the rich exhaust from the other engine bank causes the measurement of the air-fuel ratio read by the tailpipe UEGO sensor to be skewed. As another example, when fuel injectors are deactivated in an engine bank but the valves are left active, the air flowing through these cylinders into the exhaust may also skew the tailpipe UEGO reading. Furthermore, cylinder misfires may skew UEGO sensor measurements by producing inconsistent air-fuel ratios. Thus, air-fuel measurements may be validated when both engine banks operate in a lean burn mode, all fuel injectors are active, and no cylinder misfires are taking place.

If conditions in 412 are not met, the routine the routine ends. Otherwise, if the conditions in 412 are met, the routine transitions to step 414.

Next at 414, routine 400 increments a timer to measure the amount of time for the exhaust gas to travel from the feedgas UEGO sensor downstream and saturate the catalysts causing an oxygen breakthrough to occur. While this example uses time, various other durations may be used, such as a number of engine cycles, or other such non-time based duration.

At 416, routine 400 determines if the measured time is greater than an expected breakthrough time or if the exhaust sensor system detects an oxygen breakthrough. The expected breakthrough time may be calculated using a function based on the measured air mass (fn(AM)) of the exhaust. If not enough time has elapsed since the entry conditions were determined to be suitable for air-fuel validation and the oxygen breakthrough in the catalysts has not been detected, routine 400 ends. However, if enough time has elapsed or an oxygen breakthrough has occurred routine 400 moves to 418.

At 418, routine 400 calculates the expected transportation delay time for the exhaust to travel from the feedgas UEGO sensor to the tailpipe UEGO sensor. The expected transportation delay time may be calculated using a function based on the measured air mass and air speed (FN(AM,N)). It should be noted that a variety of other parameters could also be used to determine the transportation delay time.

Next at 420, routine 400 looks up the buffered feedgas UEGO measurements (see 410) based on the expected transportation delay. Specifically, the expected delay time is subtracted from the present time and the feedgas UEGO reading taken at that time may be used. Additionally, routine 400 looks up buffered feedgas UEGO measurements taken at a time before and at a time after the measurement taken at the expected time delay. The measurement times may be shifted a distance from the expected time delay measurement according to a calibratible time shift based on various operational conditions, for example, component degradation, and other suitable control strategies.

At 422, routine 400 determines a maximum value (MAX) and a minimum value (MIN) of the three feedgas UEGO measurements.

Next at 424, routine 400 shifts the minimum and maximum values to account for a known signal measurement shift between the feedgas UEGO sensor reading and the tailpipe UEGO sensor reading. Specifically, a tailpipe UEGO sensor measurement in many cases reads lower than a feedgas UEGO sensor measurement. This shift may be based on the dynamics of the exhaust system and the interaction of the exhaust flow with the catalysts.

Continuing on at 426, routine 400 compares the maximum and the minimum values to the tailpipe UEGO sensor measurement of the air-fuel ratio. These comparisons determine if the tailpipe UEGO sensor is operating within the expected window (or range). In some embodiments, the maximum and minimum values further may be shifted by calibratible limits that may be used to account for the tolerances of the exhaust sensor system. If it is determined that the tailpipe UEGO sensor measurement is between the maximum and minimum value +/− a calibratible limit, it may be assumed that the tailpipe UEGO sensor is operating as expected, and routine 400 decrements a fault counter at 428 and the routine ends.

Otherwise, if it is determined that the tailpipe UEGO sensor measurement is outside of the maximum and minimum values then the fault counter is incremented at 430.

Next at 432, routine 400 compares the fault counter to a calibratible threshold to determine if degradation has occurred in the UEGO sensors. If the fault counter is greater than the calibratible threshold then it may be assumed that degradation has occurred and an air-fuel validation condition flag may be set at 434. Note that setting of an air-fuel validation flag may result in engine control strategy reconfiguration which may include default engine operations (discussed in more detail below with reference to FIG. 6). Otherwise the fault counter is not greater than the calibratible limit and the routine ends. Accordingly, air-fuel validation routine 400 may be repeated numerous times throughout engine operation in order to provide a robust engine control strategy.

Note that according to the above routine, the feedgas linear exhaust gas sensor readings may not be verified based on the downstream linear exhaust gas sensor readings under various operating conditions and in various modes of engine operation. In particular, if the entry conditions for the verification routine are not met, the engine operating conditions are likely to produce confounded readings in the downstream linear exhaust gas sensor due to a combination of different air-fuel ratios produced by each cylinder group which mix as the exhaust gas travels through the exhaust system. Additionally, engine misfires and/or no fuel injection may skew the detected air-fuel ratio to be leaner than during full cylinder group combustion.

Furthermore, the above routine advantageously checks for suitable entry conditions including lean operation because linear exhaust gas sensors may have more accurate air-fuel ratio readings in a lean air-fuel ratio range. By performing linear exhaust gas sensor verification and diagnosis of degradation in an asymmetric exhaust configuration during lean operation errors related to sensor type and respective range of measurement accuracy may be reduced.

In this way, a feedgas UEGO sensor in an asymmetric exhaust sensor system may be validated in order to prevent unexpected engine output and maintain a functional engine control strategy.

Figure 5:
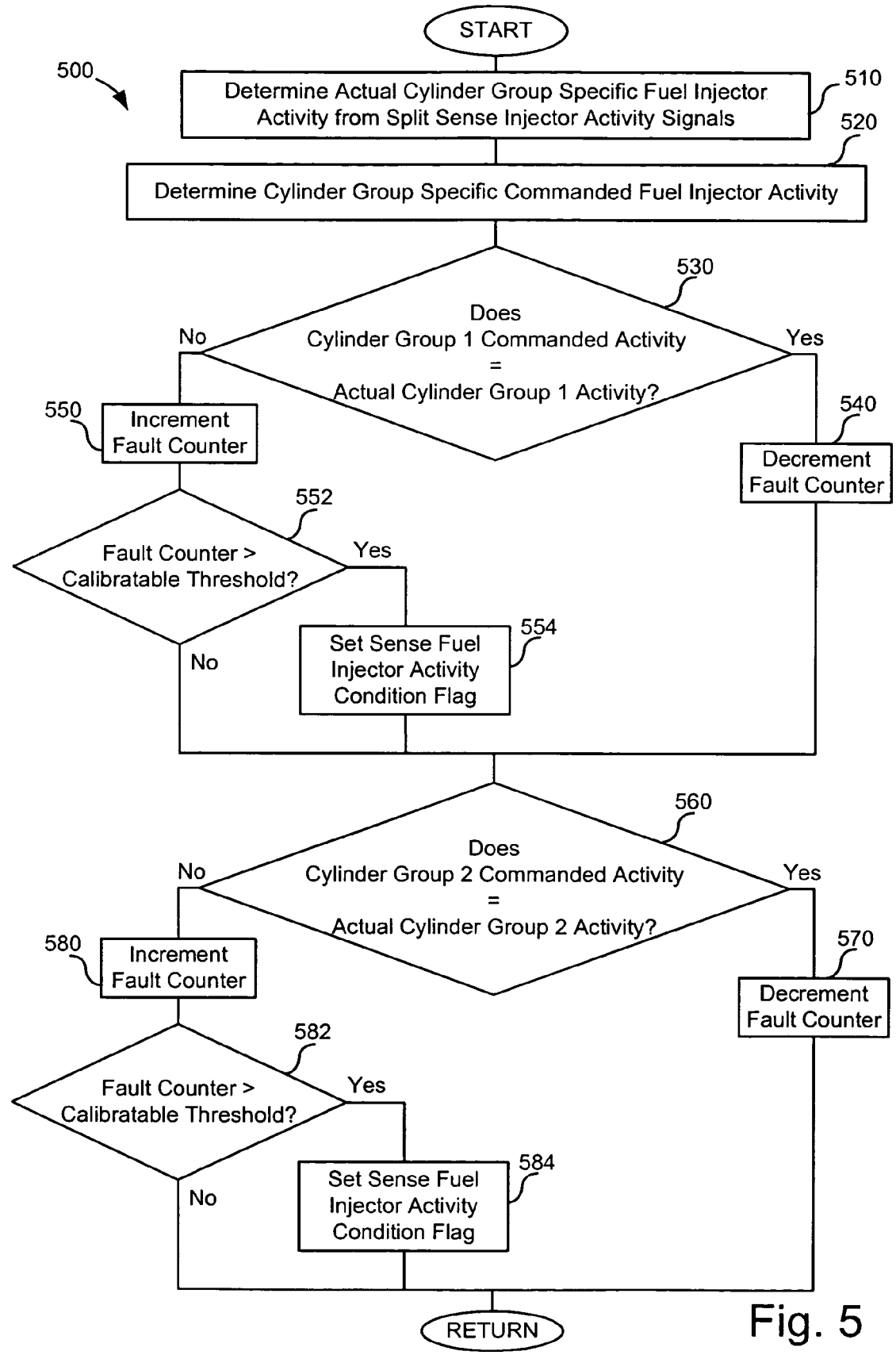
FIG. 5 is a flow diagram of an exemplary embodiment of a method of verifying fuel injector activity in cylinder groups during various modes of engine operation.

One exemplary embodiment advantageously implements a fuel injector activity verification routine as part of a robust engine control strategy. Referring to FIG. 5, exemplary fuel injector activity verification routine 500 is shown. Specifically, routine 500 verifies that fuel injectors are, in fact, deactivated when the associated cylinder are commanded to be cut-out and/or disabled as part of the engine control strategy. For example, in some powertrain control strategies it may be desirable from a fuel economy standpoint to disable a portion of the cylinder fuel injection and increase the air load of the remaining active cylinders in order to maintain a desired engine torque. During such a mode of operation if the cylinders are commanded to be deactivated but the fuel injectors remain active and the air load is increased, then an increased amount of torque may be produced. The verification routine described in FIG. 5 may be used to overcome some of these issues resulting in a more robust control strategy. Fuel injector activity verification routine 500 begins at 510 where the fuel injection activity signals may be read to determine the actual fuel injector activity for each of the cylinder groups. In some embodiments, fuel injection activity may be communicated to the electronic engine controller via logic circuitry.

Figure 7:
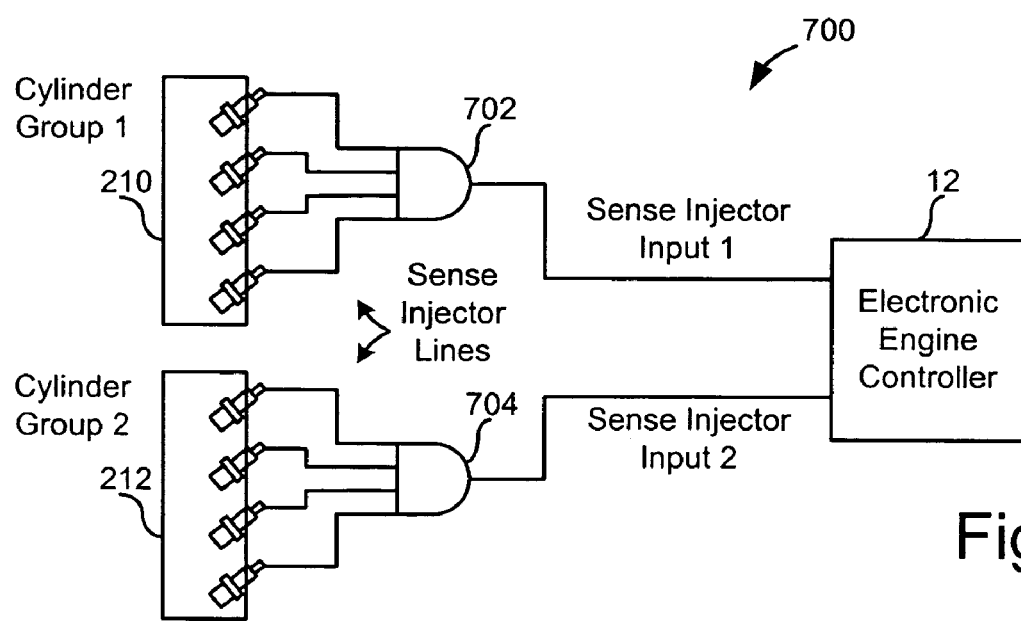
FIG. 7 is a schematic diagram of an exemplary embodiment of a fuel injector activity detection logic circuit.

Referring now to FIG. 7, an exemplary sense fuel injector activity circuit 700 is shown. In this example cylinder group 210 and cylinder group 212 each include four cylinders (not shown) and four fuel injectors, respectively. However, note that the number of cylinders and/or fuel injectors may vary in each cylinder group. Furthermore, each fuel injector may be connected to a sense injector line that shows the fuel injection activity for each cylinder. The sense injector lines associated with cylinder group 210 may be inputs into "AND" logic gate 702 and the sense injector lines associated with cylinder group 212 may be inputs into "AND" logic gate 704. The outputs of "AND" logic gates 702 and 704 may provide signals showing whether or not there is fuel injector activity in either of the cylinder groups. The outputs of "AND" logic gates 702 and 704 further may be inputs into the electronic engine controller 12, which may indicate whether or not there is any fuel injector activity in a specific group of cylinders.

It should be appreciated that the above described Boolean logic circuit is exemplary. Note that the exemplary circuit may be included as part of a larger logic circuit. Alternatively, other logic operations may be performed to indicate fuel injector activity from the sense injector lines. In some embodiments, the logic circuit may include feedback from a commanded fuel injection signal. Although the Boolean logic circuit is schematically illustrated with discrete logic gates, it should be appreciated that in some embodiments, logical operations may be performed using customizable integrated circuits, a programmable microcontroller and/or the engine controller.

Continuing at 520, the routine determines if the controller has commanded fuel injector activity for any of the specific cylinder groups. For example, if at least one fuel injector in the group has been commanded on, the group of cylinders may be considered to be actively injecting fuel. If no fuel injectors are commanded on, the group of cylinders may be considered to be inactive.

Next at step 530, the routine checks if the actual fuel injector activity for the first cylinder group from step 510 agrees with the commanded injector activity for the first cylinder group determined in step 520. If the commanded activity agrees with the actual activity, the routine moves on to step 540. At 540, the routine decrements a fault counter and transitions to step 560. If at step 530 the commanded activity does not agree with the actual activity, the routine moves to step 550. At 550, the routine increments a fault (or condition) counter and then checks the fault (or condition) counter to a calibratible threshold at step 552. If the fault (or condition) counter exceeds this threshold, the routine sets a condition flag and transitions to step 560. The condition flag may be used by other routines to change the mode of operation as will be discussed in further detail below (see steps 644 and 652 of FIG. 6). If the fault (or condition) counter does exceed the calibratible threshold, the routine transitions to step 560.

Next at step 560, the routine checks if the actual fuel injector activity for the second group from step 510 agrees with the commanded injector activity for the second group determined in step 520. If the commanded activity agrees with the actual activity, the routine moves to step 570. At 570, the routine decrements a fault counter and exits the routine. If at step 560 the commanded activity does not agree with the actual activity, the routine moves to step 580. At 580, the routine increments a fault (or condition) counter and then checks the fault (or condition) counter to a calibratible threshold at step 582. If the fault counter exceeds this threshold, the routine sets a condition flag and exits the routine. The condition flag may be used by other routines to change the mode of operation as will be discussed in further detail below (see steps 644 and 652 of FIG. 6). If the fault (or condition) counter does exceed the calibratible threshold, the routine ends. The fuel injector activity verification routine 500 may be repeated numerous times throughout engine operation in order to provide a robust engine control strategy.

In an alternative embodiment, fuel injection activity may be communicated to the electronic engine controller through a single line using logic circuitry. Specifically, logic circuitry may be used to determine if a fuel-injector cut-out mode is active or inactive.

Figure 8:
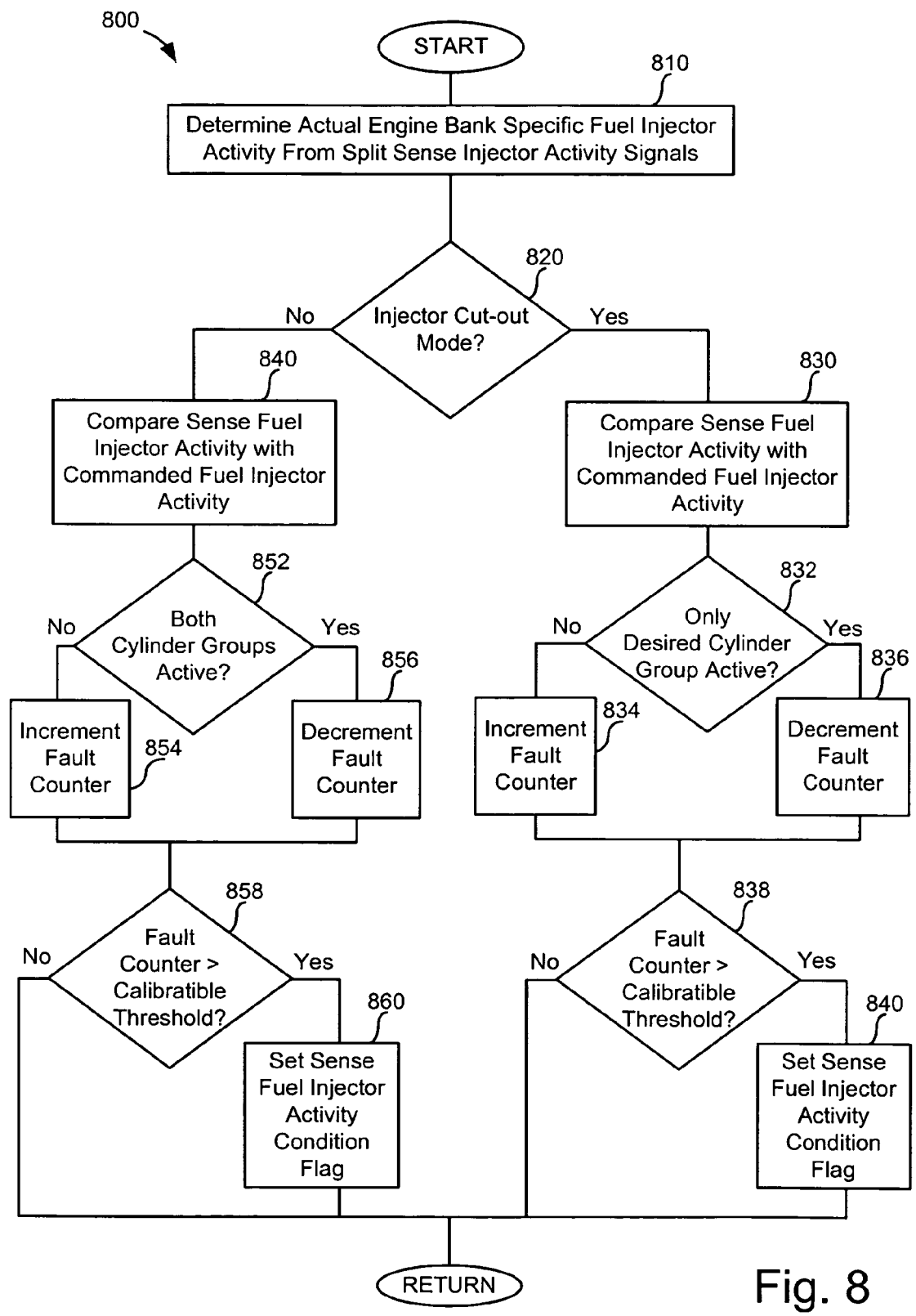
FIG. 8 is a flow diagram of an alternative exemplary embodiment of a method of verifying fuel injector cut-out mode and fuel injector activity during various modes of engine operation.

Referring to FIG. 8, Fuel injector activity verification routine 800 begins at 810 where the fuel injection signal may be read off of the sense injector line to determine the fuel injector activity for the engine groups. Next, at 820 it may be determined if the engine is in fuel injector cut-out mode.

Figure 9:
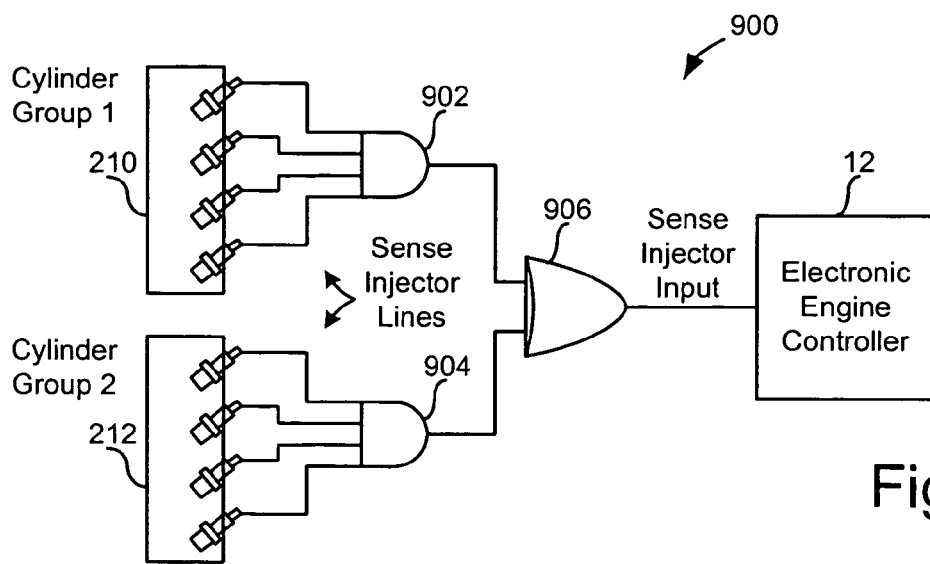
FIG. 9 is a schematic diagram of an alternative exemplary embodiment of a fuel injector cut-out mode activity detection logic circuit.

In some embodiments, the fuel injector cut-out mode determination may be performed using a Boolean logic circuit. Referring now to FIG. 9, an exemplary fuel injector cut-out determination circuit 900 is shown. In this example cylinder group 210 and cylinder group 212 each include four cylinders (not shown) and four fuel injectors, respectively. However, note that the number of cylinders and/or fuel injectors may vary in each cylinder group. Furthermore, each fuel injector may be connected to a sense injector line that shows the fuel injection activity for each cylinder. The sense injector lines associated with cylinder group 210 may be inputs into "AND" logic gate 902 and the sense injector lines associated with cylinder group 212 may be inputs into "AND" logic gate 904. The outputs of the "AND" logic gates 902 and 904 may provide signals showing whether or not there is fuel injector activity in either of the cylinder groups. The outputs of "AND" logic gates 902 and 904 further may be inputs into exclusive "OR" logic gate 906, in order to provide a feedback signal to electronic engine controller 12, which may indicate whether or not there is injector activity only in a single group of cylinders (i.e. fuel injector cut-out mode).

It should be appreciated that the above described Boolean logic circuit is exemplary. Note that the exemplary circuit may be included as part of a larger logic circuit. Alternatively, other logic operations may be performed to indicate fuel injector activity and detection of a fuel injector cut-out mode from the sense injector lines. In some embodiments, the logic circuit may include feedback from a commanded fuel injection signal. Although the Boolean logic circuit is schematically illustrated with discrete logic gates, it should be appreciated that in some embodiments, logical operations may be performed using customizable integrated circuits, a programmable microcontroller and/or the engine controller.

Figure 10:
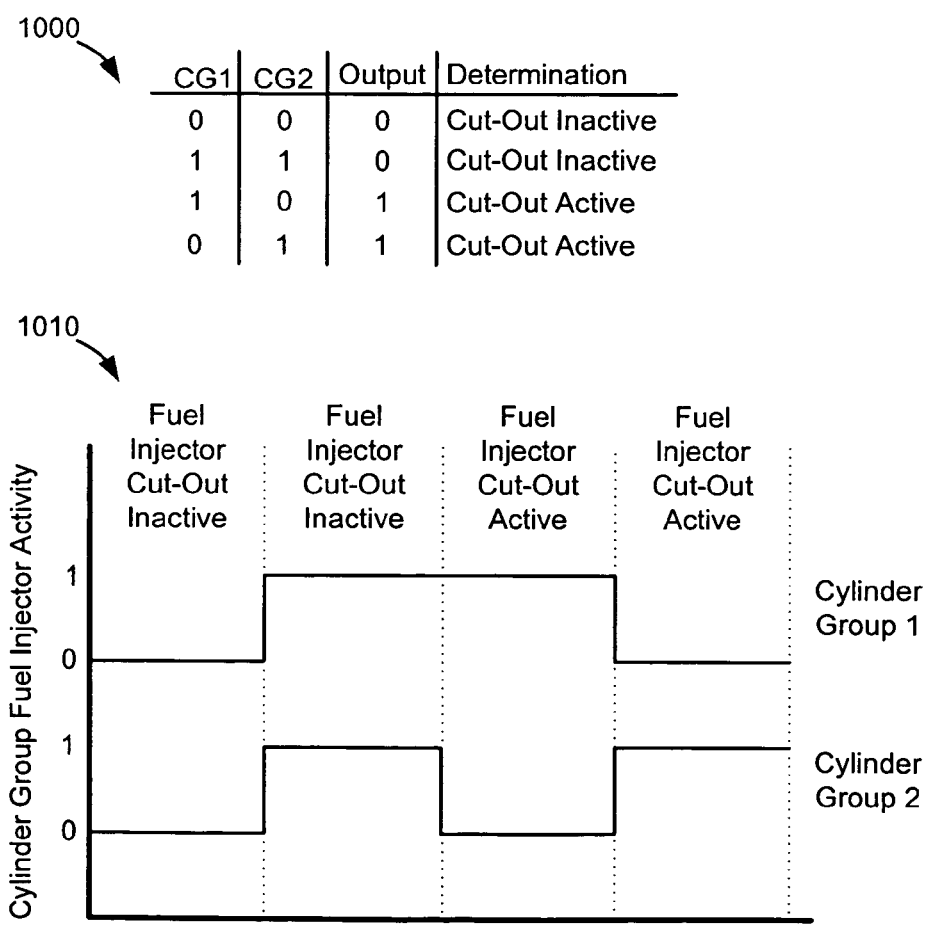
FIG. 10 is a truth table and graphical representation of the inputs and output of the logic circuit of FIG. 9.

Referring to FIG. 10, a truth table 1000 and graphical representation 1010 show the possible inputs (i.e. cylinder group specific fuel injector activity) and outputs (i.e. fuel injector cut-out mode determination) of the exclusive "OR" logic circuit. In a first exemplary condition, for example such as during a key-on and engine-off situation, both inputs values may be zero. Accordingly, the circuit may produce an output value of zero indicating that a fuel injector cut-out mode is inactive.

In a second exemplary condition, for example such as when the engine is running with all cylinders active, both input values may be one. Accordingly, the circuit may produce an output value of zero indicating that a fuel injector cut-out mode is inactive.

In a third exemplary condition, for example during a fuel injector cut-out mode a first input value may be one and a second input value may be zero. Accordingly, the circuit may produce an output value of one indicating that a fuel injector cut-out mode is active. Similarly, in a forth exemplary condition the engine may operate in fuel injector cut-out mode with the other cylinder group disabled. Accordingly, the input values of the circuit may be zero and one and the output value may be one indicating that fuel injector cut-out mode may be active.

Note that fuel injector activity further may be represented according to a fuel injection pulse frequency. Additionally, in some embodiments fuel injector activity/inactivity may be determined according to a time threshold which may be longer than the fuel injector pulse frequency. Such that when elapsed time between fuel injection pulses remains below the threshold, the fuel injectors may be determined to be active. Furthermore, if time elapses longer than the threshold time, the fuel injectors may be determined to be inactive.

Note that in some embodiment the routine may further detect cylinder group sub-set fuel injector degradation. A group sub-set may include one or more cylinders in a cylinder group. Furthermore, fuel injector activity sensors may be configured to detect the fuel injection activity of a particular cylinder group sub-set.

Continuing on with routine 800, if it is determined that the fuel injector cut-out mode is active, the routine moves to 830. At 830, the actual fuel injector activity of each group or bank of fuel injectors may be compared to the desired fuel injector activity for each engine bank.

Next at 832, routine 800 determines if only the desired group of fuel injectors is active. If only the desired group of fuel injectors is active then a fault counter is decremented at 536. Otherwise, the fault counter is incremented at 834. Next at 838, the fault counter is compared to a calibratible threshold. The threshold may be calibrated to vary the tolerance of the control strategy to account for component degradation, desired engine output, or another suitable calibration metrics. If it is determined that the fault counter is greater than the calibratible threshold then a sense injector activity condition flag is set, at 840. Otherwise, if it is determined that the fault counter is not greater than the calibratible threshold then the routine ends. Note, that the setting of a condition flag may result in various operational changes that will be discussed in further detail below.

Referring back to 820, if it is determined that the fuel injector cut-out mode is inactive, the routine moves to 850 and undergoes a similar sub-routine to verify the fuel injector activity in both groups of cylinders. Namely, at 850, the actual fuel injector activity in each group of cylinders is compared to the commanded injector activity for each group of cylinders. At 852, routine 800 determines if both groups of cylinders show the same fuel injector activity (i.e. both groups are active or inactive). If it is determined that the fuel injector activity is, in fact, the same between the groups of cylinders then the fault counter is decremented at 856. If it is determined that the fuel injector activity differs between the groups of cylinders the fault counter is incremented at 854.

Next at 858, the fault counter is compared to a calibratible threshold. As discussed above, the threshold may be calibrated according to various operational conditions and control strategies. If it is determined that the fault counter is greater than the calibratible threshold then a sense injector activity fault (or condition) flag is set, at 860. Otherwise, if it is determined that the fault (or condition) counter is not greater than the calibratible threshold then the routine ends. Accordingly, fuel injector activity verification routine 800 may be repeated numerous times throughout engine operation in order to provide a robust engine control strategy.

In this way fuel injector activity may be verified during different modes of engine operation to aid in reducing an undesired engine response upon an error in fuel injector cut-out control.

Note, that the setting of a condition flag may result in various engine control strategy reconfigurations included in the default mode strategy (discussed in further detail below with regard to FIG. 6).

In some embodiments, the fuel injector activity verification routine may be used in combination with the maximum torque estimation routine as discussed above (see FIGS. 3A-3B). For example, an engine control strategy may include modes to improve fuel economy, such as fuel injector cut-out mode. In such a strategy, air load may be increased by operating cylinder valves without injecting fuel to maintain a desired torque. In such situations, it may be desirable to verify fuel injector activity in order to reduce torque produced when the air load is increased. In this way, the fuel injector activity verification routine may be used to make the maximum torque estimation more robust.

Note that the fuel injector activity verification routines as described above also may be applied to variable displacement engine control strategies where both fuel injection and cylinder valve operation may be deactivated. In particular, fuel injection activity may be monitored using the above described routine to aid in reduce the likelihood of hydro-locking the engine due to fuel injection activity in deactivated cylinders.

One embodiment advantageously implements a high-level diagnostic routine as part of the default operation strategy. Specifically, the diagnostic routine monitors performance conditions during various modes of engine operation in order to determine if the engine is able to perform as desired in the particular mode of operation. Furthermore, the diagnostic routine may make degradation determinations regarding different components based on detection of various operating conditions. For example, a determined degradation may result in setting a service code in the electronic engine controller. Additionally, in some embodiments a degradation determination may result in the change of an engine, powertrain, and/or vehicle operating parameter. Moreover, the degradation determination may result in prevention of entering or exiting specific operational modes, or may trigger mode transitions, in order to accommodate driver demand.

Figure 6:
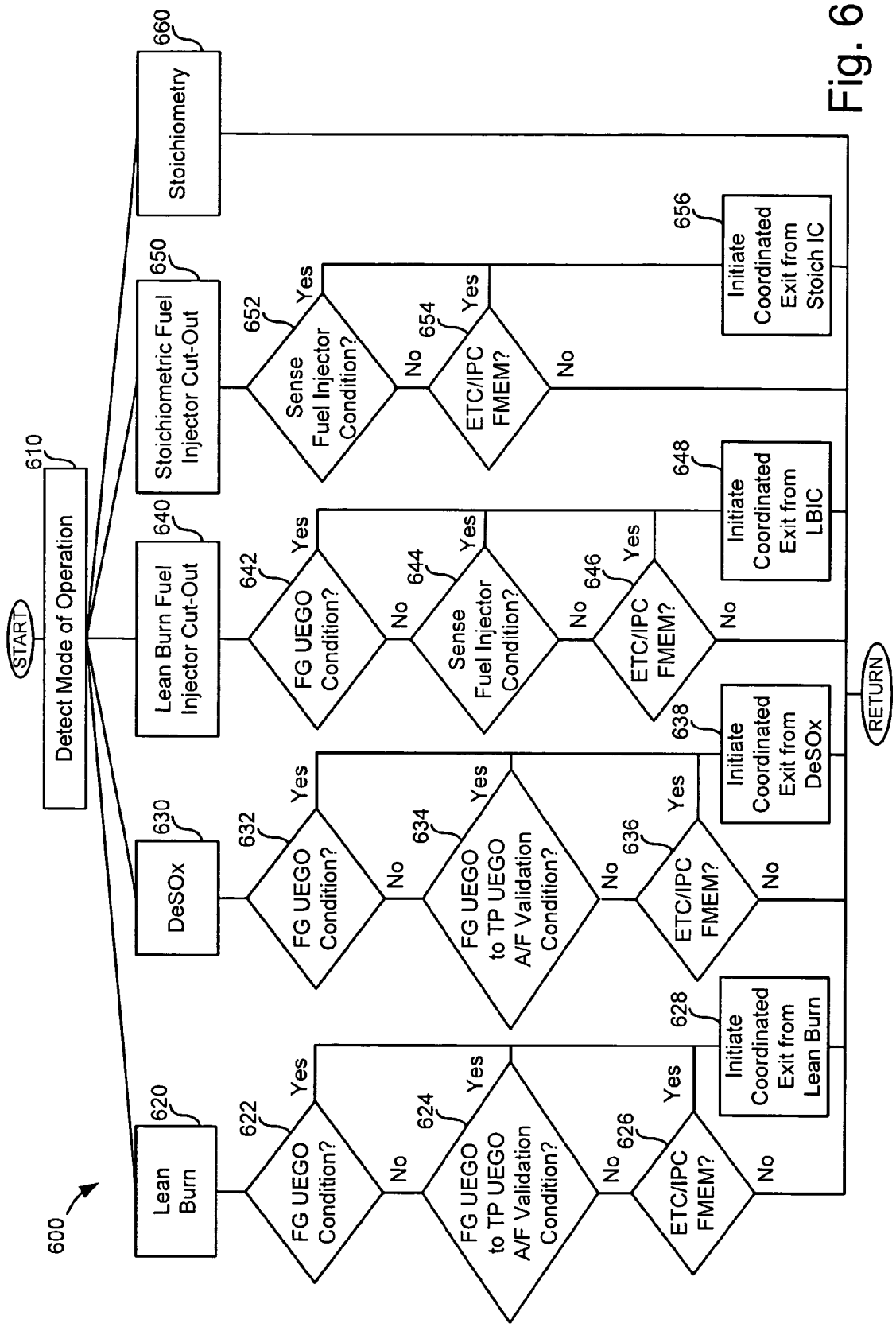
FIG. 6 is a flow diagram of an exemplary embodiment of determining performance degradation in various modes of operation of an engine.

Referring to FIG. 6, diagnostic routine 600 detects the mode of engine operation at 610. In the illustrated embodiment, the determination may result in one of five monitored engine modes, including lean bum, DeSOx, lean bum fuel injector cut-out, stoichiometric fuel injector cut-out and stoichiometric operation. However, it should be appreciated that in some embodiments various modes of operation may be omitted or added to the list of monitored engine modes in the diagnostic routine.

If it is determined that the engine is operating in lean bum mode, the routine moves to 620 to begin the lean bum diagnostic sub-routine.

At 622, diagnostic routine 600 determines if a condition has occurred showing degradation of the feedgas UEGO sensor. Note that degradation of the feedgas UEGO sensor may be detected when the associated engine bank is command to run lean due to the linear nature of the UEGO sensor output. If it determined that the feedgas UEGO sensor has degraded, the routine move to 628.

Otherwise, diagnostic routine 600 determines if a condition has occurred based on degraded validation of the air-fuel ratio between the feedgas UEGO sensor and the tailpipe UEGO sensor at 624. This condition may be retrieved from air-fuel validation routine 400 (discussed above). If it is determined that the air-fuel validation has degraded, it may be assumed that the tailpipe UEGO sensor has degraded and the routine moves to 628.

Otherwise, diagnostic routine 600 determines if a condition has occurred based on degradation of components relating to the electronic throttle control (ETC) and the torque monitor independent plausibility check (IPC) of the vehicle at 626. If it is determined that a component degradation condition has occurred the routine moves to 628. Otherwise, no degradation condition has been detected and the routine ends.

At 628, diagnostic routine 600 has detected degradation of a component that affects the performance of the engine, and further affects the effectiveness of the engine control strategy. Specifically, lean bum diagnostic sub-routine 620 may concentrate on detection of UEGO sensor degradation since the lean bum engine control strategy uses accurate detection of the air-fuel ratio to adjust the engine output such that both engine banks or groups run lean. Accordingly, diagnostic routine 600 may reconfigure the engine control strategy in order to avoid engine mode degradation and to facilitate driver demand. Specifically, the routine may initiate a coordinated exit from lean bum engine mode.

If it is determined that the engine is operating in DeSOx mode, the routine moves to 630 to begin the DeSOx diagnostic sub-routine.

At 632, diagnostic routine 600 determines if a condition has occurred showing degradation of the feedgas LEGO sensor. Note that due to the linear nature of the UEGO sensor output, degradation of the feedgas UEGO sensor may be detected when the associated engine bank is command to run lean. If it determined that the feedgas UEGO sensor has degraded, the routine moves to 638.

Otherwise, diagnostic routine 600 determines if a condition has occurred based on degraded validation of the air-fuel ratio between the feedgas UEGO sensor and the tailpipe UEGO sensor at 634. This condition may be retrieved from air-fuel validation routine 400 (discussed above). If it is determined that the air-fuel validation has degraded, it may be assumed that the tailpipe UEGO sensor has degraded and the routine moves to 638.

Otherwise, diagnostic routine 600 determines if a condition has occurred based on degradation of components relating to the electronic throttle control (ETC) and the torque monitor independent plausibility check (IPC) of the vehicle at 636. If it is determined that a component degradation condition has occurred the routine moves to 638. Otherwise, no degradation condition has been detected and the routine ends.

At 638, diagnostic routine 600 has detected degradation of a component that affects the performance of the engine, and further affects the effectiveness of the engine control strategy. Specifically, DeSOx diagnostic sub-routine 630 may concentrate on detection of UEGO sensor degradation since the DeSOx engine control strategy uses accurate detection of the air-fuel ratio to adjust the engine output such that one engine bank or group runs lean and the other engine bank or group runs rich. Accordingly, diagnostic routine 600 may reconfigure the engine control strategy in order to avoid engine mode degradation and to facilitate driver demand. Specifically, the routine may initiate a coordinated exit from DeSOx engine mode.

If it is determined that the engine is operating in lean bum fuel injector cut-out mode, the routine moves to 640 to begin the lean burn fuel injector cut-out diagnostic sub-routine.

At 642, diagnostic routine 600 determines if a condition has occurred showing degradation of the feedgas UEGO sensor. Note that due to the linear nature of the UEGO sensor output, degradation of the feedgas UEGO sensor may be detected when the associated engine bank is command to run lean. Additionally, in some embodiments, this act may be omitted since the feedgas UEGO sensor may provide incomplete readings during lean bum injector cut-out mode due to some engine configurations (i.e. cylinder groupings). If it determined that the feedgas UEGO sensor has degraded, the routine moves to 638.

Otherwise, diagnostic routine 600 determines if a condition has occurred based on unexpected fuel injector activity read off the sense injector line at 634. This condition may be retrieved from fuel injector activity verification routine 500 (discussed above). If it is determined that unexpected fuel injector activity has occurred more times than a calibratible threshold, it may be assumed that a fuel injection system related component has degraded and the routine moves to 648.

Otherwise, diagnostic routine 600 determines if a condition has occurred based on degradation of components relating to the electronic throttle control (ETC) and the torque monitor independent plausibility check (IPC) of the vehicle at 646. If it is determined that a component degradation condition has occurred the routine moves to 648. Otherwise, no degradation condition has been detected and the routine ends.

At 648, diagnostic routine 600 has detected degradation of a component that affects the performance of the engine, and further affects the effectiveness of the engine control strategy. Specifically, lean bum fuel injector cut-out diagnostic sub-routine 640 may concentrate on detecting fuel injector degradation since the lean bum fuel injector cut-out engine control strategy uses accurate detection of fuel injector activity to reduce increased torque production. Accordingly, diagnostic routine 600 may reconfigure the engine control strategy in order to reduce engine mode degradation and to facilitate driver demand. Specifically, the routine may initiate a coordinated exit from lean bum fuel injector cut-out engine mode and transition to another mode of engine operation.

If it is determined that the engine is operating in stoichiometric fuel injector cut-out mode, the routine moves to 650 to begin the stoichiometric fuel injector cut-out diagnostic sub-routine.

At 652, diagnostic routine 600 determines if a condition has occurred based on unexpected fuel injector activity read off the sense injector line at 652. This condition may be retrieved from fuel injector activity verification routine 500 (discussed above). If it is determined that unexpected fuel injector activity has occurred more times than a calibratible threshold, it may be assumed that a fuel injection system related component has degraded and the routine moves to 656.

Otherwise, diagnostic routine 600 determines if a condition has occurred based on degradation of components relating to the electronic throttle control (ETC) and the torque monitor independent plausibility check (IPC) of the vehicle at 654. If it is determined that a component degradation condition has occurred the routine moves to 656. Otherwise, no degradation condition has been detected and the routine ends.

At 656, diagnostic routine 600 has detected degradation of a component that affects the performance of the engine, and further affects the effectiveness of the engine control strategy. Specifically, stoichiometric fuel injector cut-out diagnostic sub-routine 650 is concentrated on detecting fuel injector degradation since the stoichiometric fuel injector cut-out engine control strategy uses accurate detection of fuel injector activity reduce torque production. Accordingly, diagnostic routine 600 may reconfigure the engine control strategy in order to reduce engine mode degradation and to facilitate driver demand. Specifically, the routine may initiate a coordinated exit from stoichiometric fuel injector cut-out engine mode and transition to another mode of engine operation.

In the above described routine, note that upon detection of component degradation, coordinated exit from an engine mode may be implemented as part of the default operation strategy. In one embodiment, the strategy may prioritize maintaining engine output over component degradation upon detection of a degraded mode of engine operation. Specifically, immediate exit from a potentially degraded engine mode may be prevented in order to maintain engine output in accordance with driver demand for a specified transition duration. For example, the strategy may prevent exit from lean burn engine mode when the air load has been raised in order to maintain driver requested torque.

Coordinated exit from an engine mode may further include a reconfiguration of the engine control strategy. In particular, the controller may prevent entry into a mode based on detection of a degradation condition. Furthermore, detection of a degradation condition may cause the controller to prevent entry into multiple modes of engine operation. For example, if a UEGO sensor detecting air-fuel readings for a cylinder group is determined to be degraded, the engine control strategy may prevent entry into any modes where the cylinder group operates with a lean air-fuel ratio in order to reduce engine control errors.

Furthermore, in some embodiments the engine may transition out of different modes at different rates in order to accommodate changes in operating conditions. For example, a transition out of stoichiometric engine operation mode to a lean burn fuel injector cut-out mode may occur faster than another mode transitions such as transitioning out of a fuel injector cut-out mode. Specifically, once fuel injection is disabled in a cylinder group, air load may need to be increased quickly to increase engine torque output in order meet driver demands.

As another example, during a fuel injector cut-out mode, air load in the engine may be increased to produce a sufficient amount of torque in the active cylinder group. If the engine transitions out of the fuel injector cut-out mode to a mode where all cylinder groups combust air and fuel without allowing for the air in the engine to decrease and match the injected fuel, errors in torque output and emissions may be increased. Therefore, the mode transition may last over a longer duration than the above mentioned transition out of stoichiometric engine operation.

Note that in some embodiments, an engine mode transition in response to sensor degradation may be slower than a mode transition in response to a driver request in order to provide a period to match air and fuel amounts as discussed above, thus reducing the likelihood of increased emissions due to unmatched air and fuel amounts.

Furthermore, it should be appreciated that high level diagnostic routine 600 may be repeated numerous times throughout engine operation in order to provide a robust engine control strategy. Alternatively, in some embodiments the diagnostic routine may be omitted from the engine control strategy.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A multi-cylinder group engine system operable in at least a first mode and a second mode, wherein the first mode a first and second cylinder group combust air and fuel, and wherein the second mode at least one of the first and second cylinder groups combusts air and fuel and the other one of the first and second cylinder groups pumps air without injected fuel, the engine system comprising:
 a first linear exhaust gas sensor disposed in a first exhaust passage to measure air-fuel exhausted from the first cylinder group;
 a second exhaust gas sensor disposed in a second exhaust passage to measure air-fuel exhausted from the second cylinder group;
 a third linear exhaust gas sensor disposed downstream of a junction between the first exhaust passage and the second exhaust passage; and
 a controller configured to validate a reading of the first linear exhaust gas sensor during the first mode of engine operation based on a reading of the second exhaust gas sensor when a lean air-fuel ratio is commanded.

2. The system of claim 1 wherein the controller is further configured to validate a reading of the first linear exhaust gas sensor during the first mode of engine operation based on a reading of the third linear exhaust gas sensor when the first linear exhaust gas sensor and the second exhaust gas sensor detect a lean air-fuel ratio.

3. The system of claim 1 wherein the controller is further configured to disable validation of a reading of the first linear exhaust gas sensor based on a reading of the third linear exhaust gas sensor when the engine is operating in the second mode.

4. The system of claim 1 wherein the controller is further configured to disable validation of a reading of the first linear exhaust gas sensor based on a reading of the third linear exhaust gas sensor when at least one cylinder in at least one of the first and second cylinder groups is pumping air without injecting fuel.

5. The system of claim 1 wherein the controller is further configured to disable validation of a reading of the first linear exhaust gas sensor based on a reading of the third linear exhaust gas sensor responsive to detection of a cylinder misfire over a predetermined duration.

6. The system of claim 1 wherein the controller is further configured to use the air-fuel reading of the first linear exhaust sensor to control fuel injection in both the first and the second cylinder groups during the first mode of engine operation.

7. The system of claim 1 wherein the second exhaust gas sensor is a linear exhaust gas sensor.

8. The system of claim 1 wherein the second exhaust gas sensor is a switching type exhaust gas sensor.

9. The system of claim 1 wherein the controller is further configured to disable lean air-fuel operation in at least one of the first and second modes of engine operation based on unsuccessful validation of first linear exhaust gas sensor reading.

10. A system comprising:
- an engine including a first cylinder group and a second cylinder group;
- an exhaust system coupled to the engine, wherein the first cylinder group exhausts gas into at least a first exhaust passage and the second cylinder group exhausts gas into at least a second exhaust passage;
- a first linear exhaust gas sensor disposed in the first exhaust passage;
- a first switching type exhaust gas sensor disposed in the second exhaust passage;
- a second linear exhaust gas sensor disposed downstream from a junction of the first exhaust passage and the second exhaust passage; and
- a controller configured to operate the engine in a first mode where the first and second cylinder groups combust air and fuel, and a second mode where at least one of the first and second cylinder groups combusts air and fuel and the other one of the first and second cylinder groups pumps air without injecting fuel, and the controller is further configured to validate a reading of the first linear exhaust gas sensor based on a reading of the second linear exhaust gas sensor during the first mode of engine operation when a lean air-fuel ratio is commanded.

11. The system of claim 10 wherein the controller is further configured to validate a reading of the first linear exhaust gas sensor based on a reading of the second linear exhaust gas sensor during the first mode of engine operation when the first linear exhaust gas sensor and the first switching type exhaust gas sensor detect a lean air-fuel ratio.

12. The system of claim 10 wherein the controller is further configured to disable validation of a reading of the first linear exhaust gas sensor based on a reading of the second linear exhaust gas sensor when the engine is operating in the second mode.

13. The system of claim 10 wherein the controller is further configured to disable validation of the first exhaust gas sensor based on a reading of the second exhaust gas sensor when at least one cylinder in at least one of the first and second cylinder groups is pumping air without injecting fuel.

14. The system of claim 10 wherein the validation is based on a threshold operating range based on relative maximum and minimum air-fuel values measured by the first linear exhaust gas sensor at the beginning of the validation sequence.

15. The system of claim 10 wherein the controller is further configured to trigger a diagnostic trouble code based on unsuccessful sensor validation.

16. The system of claim 10 wherein the controller is further configured to adjust engine torque based on an air-fuel reading of the first linear exhaust gas sensor only upon successful validation of the reading of the first linear exhaust gas sensor.

17. A method for detecting exhaust gas sensor degradation in an engine system, the engine having an asymmetric exhaust gas sensor configuration to provide air-fuel feedback for control of engine output, the method comprising:
- measuring lean air-fuel ratio readings over a first duration by a first linear exhaust gas sensor;
- measuring lean air-fuel ratio readings over a second duration by a second linear exhaust gas sensor downstream from the first linear exhaust gas sensor based on detection of oxygen breakthrough in a catalyst;
- shifting the first measurement duration to correspond to the second measurement duration based on an exhaust gas transportation duration;
- comparing the air-fuel ratio readings of the first and second sensors during the corresponding measurement durations; and
- setting a degradation condition responsive to a discrepancy between the readings of the first and second sensors during the corresponding measurement durations.

18. The method of claim 17 wherein the air-fuel readings of the first sensor include an operating range based on relative maximum and minimum air-fuel ratios measured during the first duration.

19. The method of claim 17 wherein the degradation condition includes preventing entry into a mode of lean engine operation.

20. The method of claim 17 wherein the comparison of the air-fuel reading is suspended until oxygen breakthrough in a catalyst has been determined.

* * * * *